M. HEFTER.
KNITTED ELECTRIC HEATING BODY.
APPLICATION FILED FEB. 1, 1910.
975,359.
Patented Nov. 8, 1910.
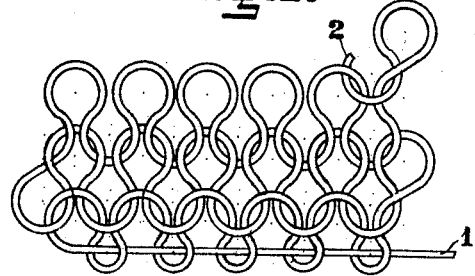
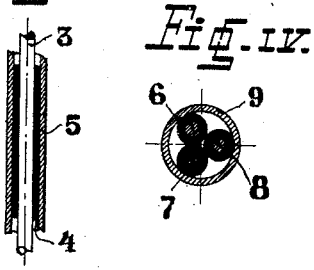
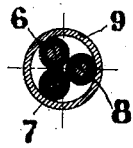
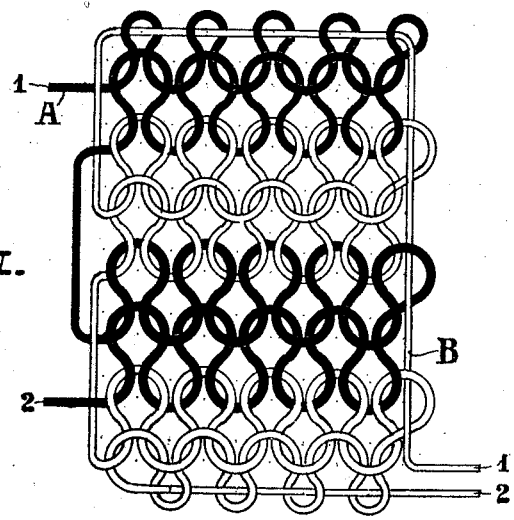
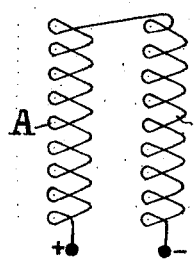
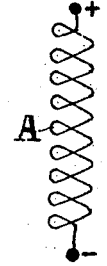
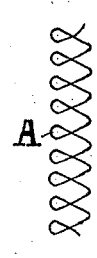
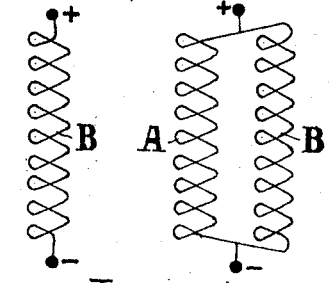
Witnesses:
Inventor,
Michel Hefter,

UNITED STATES PATENT OFFICE.

MICHEL HEFTER, OF ST. PETERSBURG, RUSSIA, ASSIGNOR TO LEONARD J. LEWERY, OF NEW YORK, N. Y.

KNITTED ELECTRIC HEATING-BODY.

975,359.  Specification of Letters Patent.  Patented Nov. 8, 1910.

Application filed February 1, 1910. Serial No. 541,400.

*To all whom it may concern:*

Be it known that I, MICHEL HEFTER, a subject of the Czar of Russia, residing at St. Petersburg, in the Empire of Russia, have invented certain new and useful Improvements in Knitted Electric Heating-Bodies; and I do hereby declare the following to be a full, clear, and exact description of the invention, such as will enable others skilled in the art to which it appertains to make and use the same.

My invention relates to improvements in electric heaters which can be put in the circuit of any electric house installation. From the apparatus of this kind hitherto known the heaters embodying the present invention differ in that they have the form of a network, of which the metal wires traversed by the electric current are inserted in an incombustible insulating covering.

The accompanying drawing illustrates for example some forms of carrying out the object of the present invention.

Figure 1 shows a network of the simplest form; Fig. 2— is an example of a network made in two rows; Fig. 3— is a longitudinal section of the insulating covering of a conductor; Fig. 4— is a transverse section of a triple wire conductor; Figs. 5, 6, 7 and 8 show various methods of connecting two rows or wires of the network.

In carrying out my improved electric heaters I employ a wire 3 (Fig. 3) of metal, as copper, nickel or the like, which is then surrounded with an incombustible insulation, preferably with asbestos, and braided in the usual manner with cotton, silk or the like. In the case of multiple wire, as for example three-wire conductor (Fig. 4), each wire 6, 7, 8 is covered with asbestos and then all the wires, either stranded or disposed side by side, are surrounded with a braiding 9. The wires 6, 7, 8, as shown in the Fig. 4, can be of different cross section. From the insulated wire obtained in the manner above described I make by means of knitting-needles or a crochet a network, of which an example is shown in Fig. 1. It will be understood, that the network can be executed in any desired other form, whereby the finished product can be in the form of a handkerchief, of a strap, or any desired article. The final product can also be in the form of a stocking, or glove, or hat, or the like. Moreover, the product can be obtained from two wires, as shown in Fig. 2, where certain transverse portions of the fabric are represented as being formed by looping or knitting the wire A while other transverse sections thereof are formed by knitting the wire B, these sections alternating and being of short length, usually each of but two or three rows of loops. The arrangement illustrated in Fig. 2 is however, merely illustrative of the invention and may be varied. It shows how, by using the circuit embracing the wire A, a certain portion or portions of the fabric may be heated, while by heating the wire B, a different portion or portions may be heated. Or, again, by making the longitudinal sections narrow when one or the other circuit only is used the fabric will be heated to a certain degree and when both are employed to a higher degree.

On connecting with the current supply one of the wires or the other, or both wires at the same time, or both wires in series, I can obtain different degrees of heating effect, also a heating effect extending only to predetermined portions of the network. For instance the central portion can be heated up to a higher degree, than the surrounding parts or vice versa. On the other hand, in the case of a multiple-wire conductor or conductors, on connecting the wires thereof either separately or in groups I can obtain a very great number of combinations. Thus in a fabric in which are included two conducting wires, whether these be united into a compound cord such as illustrated in Fig. 4, or entirely separate from each other as represented in Fig. 2, there can be obtained four different combinations as indicated in Figs. 5 to 8, and these combinations in turn will impart to the fabric four different degrees of heat.

Fig. 5 shows both the conductors $a$ and $b$ connected in series; in Fig. 6 only the conductor $a$ is connected to the current supply, in Fig. 7— only the conductor $b$; in Fig. 8 both the conductors $a$ and $b$ are connected in multiple. For three wires or three separate conductors 17 combinations are obtainable, for 4 wires or conductors 51 combinations and so on. Thus, on choosing in suitable manner different wires and their combinations, a variation of the heating temperature of 1 or 2° is obtainable. By the use of the network products above described the danger of any excessive superheating is obviated owing to the fact that by this system, which differs in this respect from the others, air circulates constantly between the eyes or loops of the network. Moreover, the products being in the form of a network, they can be stretched and are generally very flexible and elastic.

If found desirable a non-conducting or other thread filament which does not enter into the electric circuit, can be introduced into and constitute a part of the fabric. Thus in place of one or more of the conducting wires 6, 7, or 8, represented in Fig. 4, a non-conducting thread or filament could be employed.

What I claim, and desire to secure by Letters Patent is:

1. An electric heater consisting of a fabric in which is incorporated a filament adapted to conduct electricity and to be heated by the passage of a current thereof, the said filament being incorporated into successive transverse sections of the fabric, such sections being separated by other transverse sections of the fabric not including the said filament, and the filament being carried from one section into which it enters to the next along the edge of the fabric where it is left exposed.

2. An electric heater consisting of a fabric in which are incorporated a plurality of filaments adapted to conduct electricity and to be heated by the passage of a current thereof, the different filaments being incorporated into successive transverse sections of the fabric, those including one filament being separated by the sections including the other or others, and the conducting filaments being carried to an edge of the fabric where they extend from one section to the next and are there left exposed.

3. An electric heater consisting of a knitted fabric in which are incorporated as parts of the fabric a plurality of insulated electric conductors, the said conductors being independently knit into the fabric in successive short transverse sections thereof the said transverse sections formed by one conductor being separated from each other by other transverse sections of the fabric not including the said conductor, and each conductor being adapted to constitute part of an independent electric circuit and being carried from one transverse section into which it enters to the next in which it enters along the edge of the fabric.

4. An electric heater consisting of a knitted fabric into which is incorporated as a part of the fabric an insulated electric conductor, the said conductor being knitted into successive transverse sections of the fabric, said sections being separated by other knitted transverse sections not including the said conductor, and the conductor being carried from one section into which it enters to the next without being knitted into the fabric whereby it is left exposed so that a supply wire may be easily connected therewith.

In testimony whereof, I affix my signature, in presence of two witnesses.

MICHEL HEFTER.

Witnesses:
 MOISEY LUISARENKO,
 H. A. LOVIAGUINE.